United States Patent [19]

Holt

[11] Patent Number: 5,448,684

[45] Date of Patent: Sep. 5, 1995

[54] NEURAL NETWORK, NEURON, AND METHOD FOR RECOGNIZING A MISSING INPUT VALVE

[75] Inventor: James C. Holt, Del Valle, Tex.

[73] Assignee: Motorola, Inc., Schaumburg, Ill.

[21] Appl. No.: 150,295

[22] Filed: Nov. 12, 1993

[51] Int. Cl.6 .............................................. G06F 15/00
[52] U.S. Cl. ........................................ 395/24; 395/21; 395/27; 382/156
[58] Field of Search ................. 395/23, 24, 27, 22-25; 382/12-15

[56] References Cited

U.S. PATENT DOCUMENTS

| | | | |
|---|---|---|---|
| 4,874,963 | 10/1989 | Alspector | 395/24 |
| 5,073,867 | 12/1991 | Murphy et al. | 395/27 |
| 5,093,899 | 3/1992 | Hiraiwa | 395/23 |
| 5,109,351 | 4/1992 | Simar, Jr. | 395/24 |
| 5,136,687 | 8/1992 | Edelman et al. | 395/22 |
| 5,214,745 | 5/1993 | Sutherland | 395/22 |
| 5,253,329 | 10/1993 | Villarreal et al. | 395/23 |

OTHER PUBLICATIONS

Steck, "Convergence of recurrent networks as contraction mappings", IJCNN International Joint Conference on Neural Networks, pp. 462–467 vol. 3, 7–11 Jun. 1992.
Chen et al, "ANN with two-dendrite neurons as its weight initialization"; IJCNN International Joint Conference on Neural Networks, pp. 139–146 vol. 3, 7–11 Jun. 1992.
Kim et al, "A study of dynamic behavior of a recurrent neural network for control", Proceedings of the 30th IEEE Conference on Decision and Control, pp. 150–155 vol. 1, 11–13 Dec. 1991.

*Primary Examiner*—Allen R. MacDonald
*Assistant Examiner*—Tariq Hafiz
*Attorney, Agent, or Firm*—Paul J. Polansky

[57] ABSTRACT

A neuron (100) has a null-inhibiting function so that null inputs do not affect the output of the neuron (100) or updating of its weights. The neuron (100) provides a net value based on a sum of products of each of several inputs, and corresponding weight and null values, and provides an output in response to the net value. A neural network (40) which uses such a neuron (100) has a first segmented layer (41) in which each segment (50-52) corresponds to a manufacturing process step (60-62). Each segment of the first layer (41) receives as inputs measured values associated with the process step (60-62). A second layer (42) connected to the first layer (41), is non-segmented to model the entire manufacturing process (80). The first (41) and second (42) layers are both unsupervised and competitive. A third layer (43) connected to the second layer (42) then estimates parameters of the manufacturing process (80) and is unsupervised and noncompetitive.

25 Claims, 3 Drawing Sheets

FIG.1 —PRIOR ART—

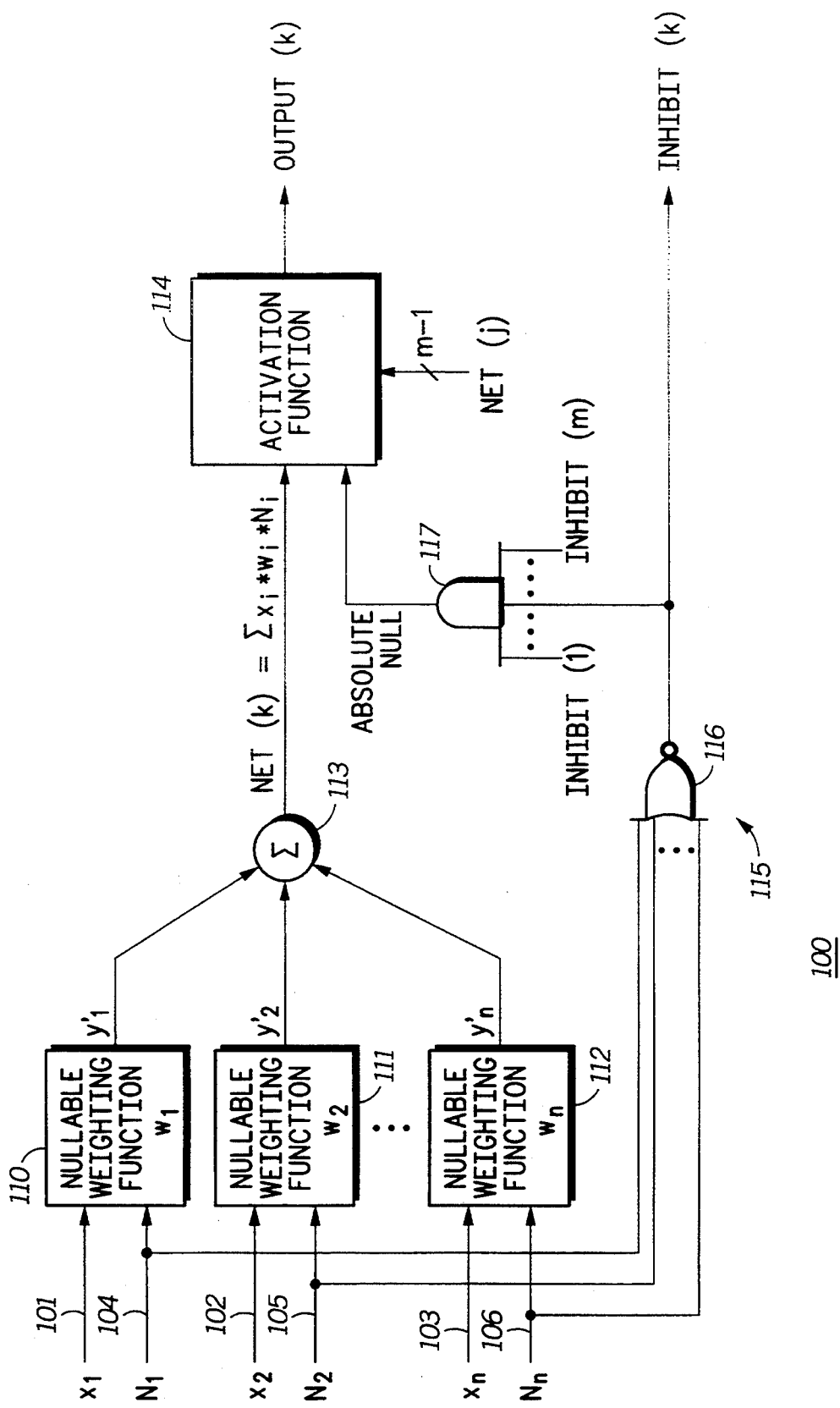

NEURAL NETWORK, NEURON, AND METHOD FOR RECOGNIZING A MISSING INPUT VALVE

FIELD OF THE INVENTION

This invention relates generally to processing systems, and more particularly, to neural networks.

BACKGROUND OF THE INVENTION

Artificial neural networks, known also as simply neural networks, grew out of attempts to understand the workings of the human brain. A neural network is a processing system which exists in a massively parallel form, and includes many individual processing elements known as neurons. The neuron receives several inputs and is connected to other neurons through the equivalent of synapses. In one type of neural network, known as a competitive neural network, a neuron conditions the inputs by weighting functions, sums the weighted inputs, and activates an overall output ("fires") if its weighted sum exceeds the weighted sums of other neurons in the layer. The weights are adjusted through a process of training in which an output in the neuron's layer or some other layer is compared to an expected output and a feedback signal adjusts the weights until the neural network provides the expected output.

Neural networks are useful for heuristic tasks for which normal computing systems are inefficient or inaccurate, such as speech recognition and synthesis, pattern recognition, artificial vision, and the like. However, some features of known neural networks prevent their use for solving problems for which they would normally be ideally suited. For example, a neural network may be used to model a manufacturing process. The manufacturing process, while generally deterministic, is nonetheless affected by many variables and thus is difficult to model using normal mathematical models. This neural network would receive measured characteristics of a manufactured good as inputs, and estimate unknown characteristics of the manufactured good such as quality and performance compared to specifications. However, if this neural network were trained using a given set of inputs, it would require all of these inputs to be available in order to make an accurate prediction. Frequently in manufacturing processes, measurements are lost or unobtainable. Conventional neural networks are unable to adjust for the missing measurement without distorting the predicted outputs and readjusting the weights. What is needed, then, is a neural network and a neural processing element which allows neural networks to be used for such tasks.

SUMMARY OF THE INVENTION

Accordingly, the present invention provides, in one form, neuron for recognizing a missing input value. A predetermined number of first inputs receives data inputs of the neuron. A plurality of second inputs corresponding to each of the predetermined number of first inputs receives null values. Each null value is in either a first logic state if a corresponding data input is missing, or a second logic state otherwise. A plurality of nullable weighting elements is coupled to the predetermined number of first inputs and to the plurality of second inputs. Each nullable weighting element has a weight associated therewith and provides an output thereof as a product of either a corresponding data input and the weight when a corresponding null value is in the first logic state, or as a predetermined value otherwise. A summing device is coupled to the plurality of nullable weighting elements, and sums outputs of each nullable weighting element to provide a net output. An activation element is coupled to the summing device, and provides an output of the neuron in response to the net output and a predetermined activation function.

In another form, the present invention provides a neural network suitable for manufacturing process parameter estimation or the like, comprising first and second layers of segmented neurons and a third layer of neurons. The first layer of segmented neurons is of a first type, receives a plurality of input signals, and provides a plurality of first output signals in response. The second layer of neurons is of a second type, and is operably coupled to the first layer of segmented neurons. The second layer of neurons receives each of the plurality of first output signals, and activates at least one of a second plurality of output signals in response. The third layer of neurons is of a third type and is operably coupled to the second layer of neurons. The third layer of neurons receives the second plurality of output signals, and provides at least one output of the neural network in response to the at least one of the second plurality of output signals activated by the second layer of neurons. The first and second types are characterized as being unsupervised and competitive. The third type is characterized as being supervised and noncompetitive.

In still another form, the present invention comprises a method for estimating an unknown parameter associated with a manufacturing process. Either a plurality of first measured values of the manufacturing process or a plurality of first null values is inputted to a first neuron segment. Either a plurality of second measured values of the manufacturing process or a plurality of second null values is inputted to a second neuron segment. Each of a plurality of neurons of the first neuron segment is operably coupled together such that each of the plurality of neurons of the first neuron segment provides an output thereof in partial dependence on the output of others of the plurality of neurons of the first neuron segment. Each of a plurality of neurons of the second neuron segment is operably coupled together such that each of the plurality of neurons of the second neuron segment provides an output thereof in partial dependence on the output of others of the plurality of neurons of the second neuron segment. The unknown processing parameter is estimated from the outputs of each of the first and second neuron segments when at least one of the pluralities of first and second null values is inactive.

These and other features and advantages will be more clearly understood from the following detailed description taken in conjunction with the accompanying drawings.

BRIEF DESCRIPTION OF THE DRAWINGS

FIG. 3 illustrates in partial block diagram and partial logic diagram form a neuron used in one of the neuron layers of FIG. 2.

DETAILED DESCRIPTION OF A PREFERRED EMBODIMENT

Figure 1:
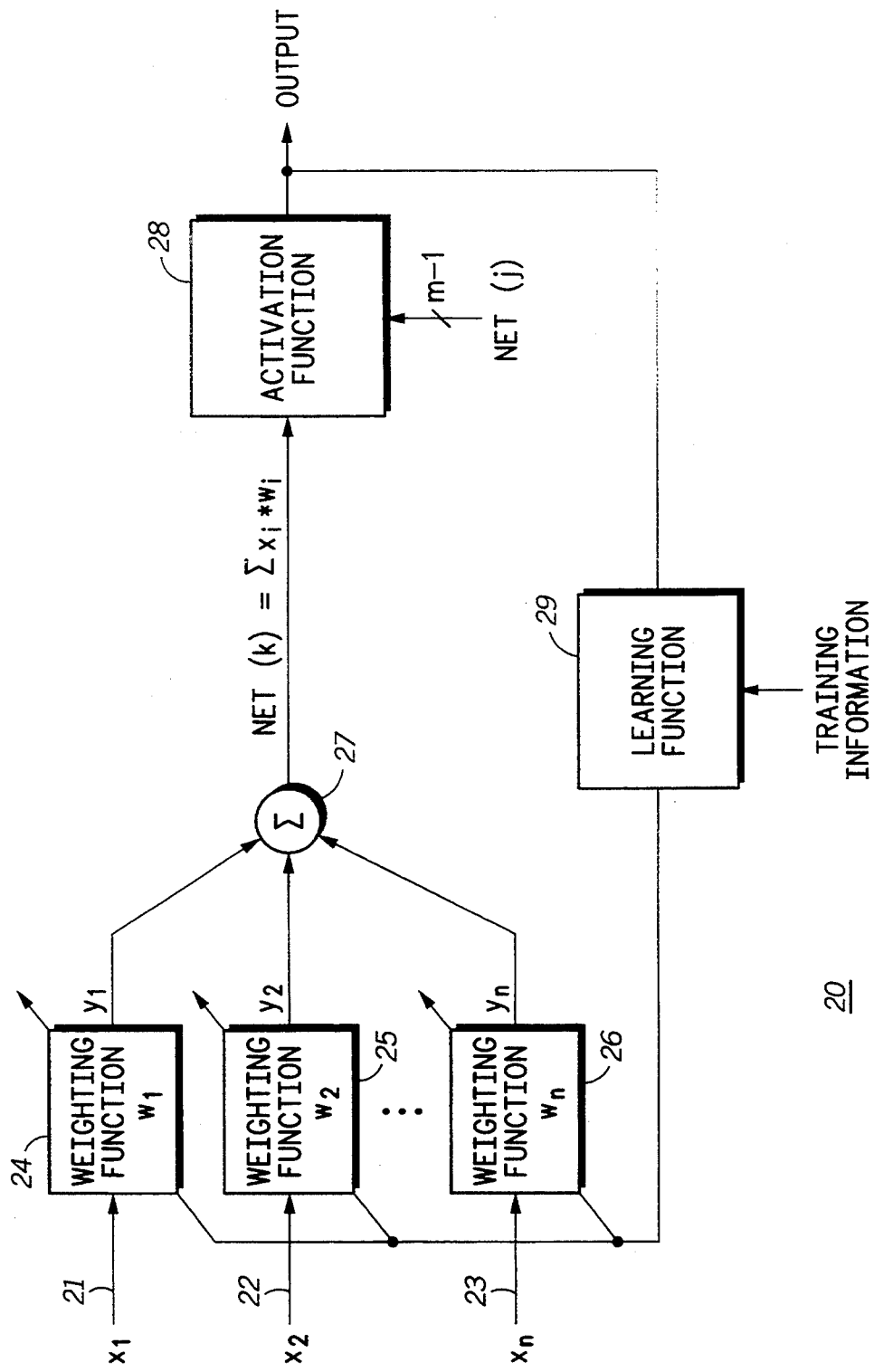
FIG. 1 illustrates in partial block diagram and partial logic diagram form a conventional neuron known in the prior art.

FIG. 1 illustrates in partial block diagram and partial logic diagram form a conventional neuron 20 known in the prior art. Neuron 20 includes n inputs for receiving an input vector designated "X" having elements labelled "$x_i$" for each of n inputs. FIG. 1 illustrates representative inputs 21-23 for receiving signals $x_1$, $x_2$, and $x_n$, respectively. Neuron 20 conditions the n inputs with corresponding weights labelled "$w_i$" to provide corresponding outputs labelled "$y_i$", for $i=1$ to n. FIG. 1 illustrates three representative weighting functions 24-26 corresponding to inputs $x_1$, $x_2$, and $x_n$, applying weights $w_1$, $w_2$, and $w_n$ to provide outputs $y_1$, $y_2$, and $Y_n$, respectively. A summing device 27 has inputs for receiving each weighted output $y_i$, and an output for providing a summed output labelled "NET(k)", whose value is expressed as:

$$NET(k) = \Sigma y_i = \Sigma x_i * w_i \quad [1]$$

where the summing interval is from 1 to n.

Neuron 20 also includes an activation function 28 having an input for receiving NET(k) and inputs for receiving corresponding NET values from other neurons to which neuron 20 is connected. In the illustrated embodiment, neuron 20 is connected in a network of m competitive neurons, and is the kth element. Thus, activation function 28 receives m NET values labelled "NET(j)", for $j=1$ to m, including $(m-1)$ NET values from other neurons, and NET(k) from neuron 20. Neuron 20 provides an output signal labelled "OUTPUT" in response to activation function 28 detecting NET(k) being greater than each of the other NET values. Thus, activation function 28 is a threshold activation function and neuron 28 is part of a competitive neuron layer.

Neuron 20 also includes a learning mechanism for adjusting weights $w_i$ formed by a learning function 29. Learning function 29 has an input for receiving signal OUTPUT, an input for receiving a signal labelled "TRAINING INFORMATION", and outputs connected to feedback inputs of each weighting functions 24-26. During a training interval, learning function 29 adjusts weights $w_i$ in response to TRAINING INFORMATION. Thereafter, learning function 29 is operative in response to OUTPUT to adjust weights $w_i$.

Neuron 20 is a supervised neuron. In training this form of neuron, the OUTPUT signal which is produced by neuron 20 is compared to a desired output to produce the TRAINING INFORMATION. The TRAINING INFORMATION is used by learning function 29 to adjust the individual elements $w_i$ of a weight vector designated "W".

Neuron 20 is also a competitive neuron. The NET values of all other neurons in the competitive network are used in the activation function of this form of neuron. The OUTPUT signal from neuron 20 is thus influenced by the activities in the surrounding neurons.

An alternative form of neuron is classified as competitive and unsupervised. Networks composed of this form of neuron are said to be self-organizing. The organization of the network is such that it tends to separate the domain of the input data into multiple clusters. Each cluster is associated with a neuron in the network. The neuron represents the centroid of the cluster. All input values which lie within a certain distance of the centroid as calculated by some distance function are said to lie within the cluster.

A disadvantage of using neuron 20 in a network which is being utilized in a manufacturing process is the lack of an explicit way to represent missing information. It is possible to implicitly identify missing data by encoding the input data; i.e., zero or some other value could be chosen as a value which represents missing data. However, it is not a good general rule to do so since data could possibly assume in reality any chosen value which represents missing data. In addition, manufacturing data is frequently stored in relational databases, which can explicitly represent the fact that data should have been collected at a certain stage in a manufacturing process, but was not.

Another disadvantage of using neuron 20 to represent a manufacturing processes is the lack of a capability to self-organize to represent the clusters of related manufacturing information. Since it is desirable for the network to organize in relation to the organization of the manufacturing process, a new type of neuron is needed.

Figure 2:
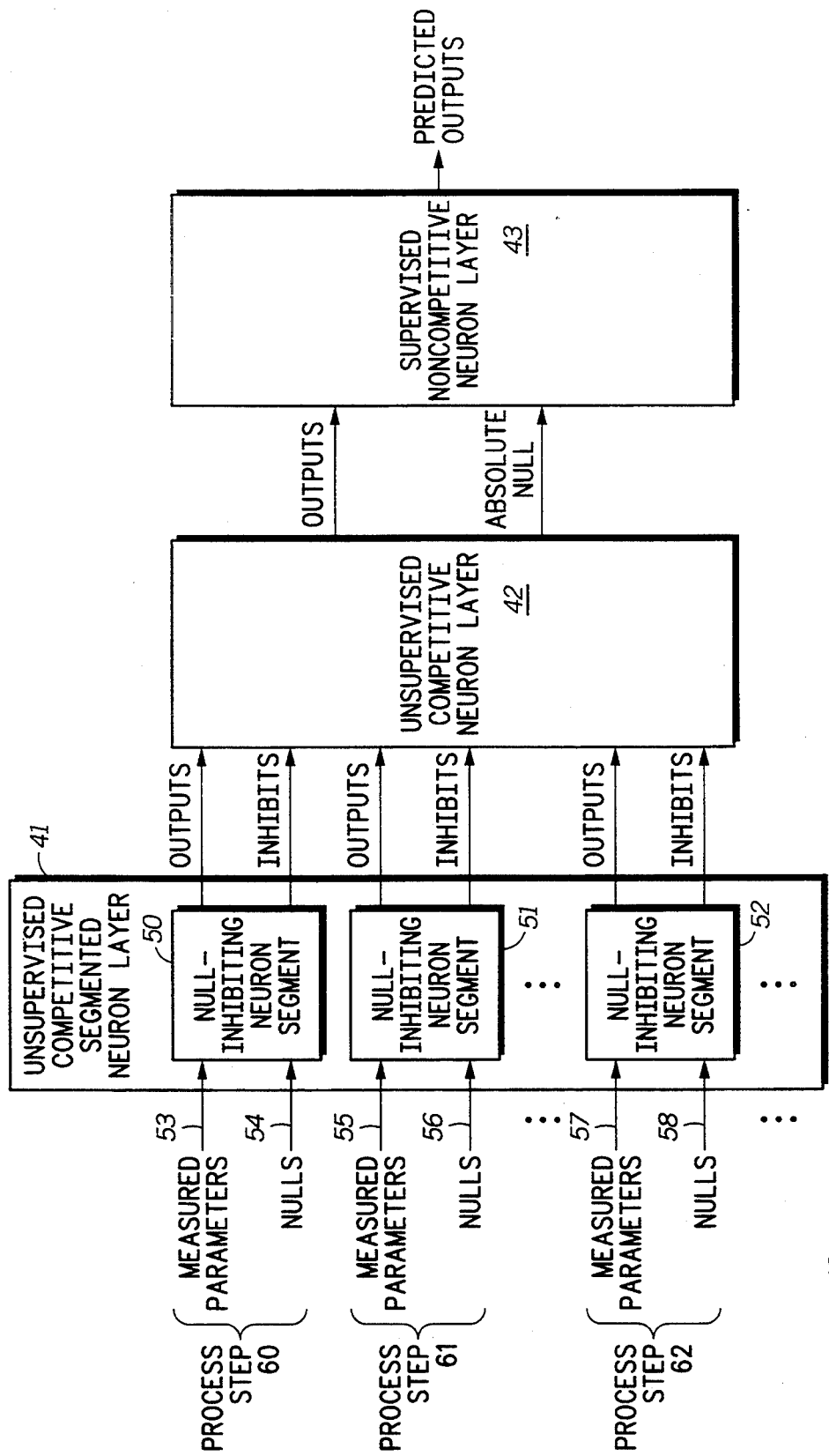
FIG. 2 illlustrates in block diagram form a neural network suitable for manufacturing process estimation or the like according to the present invention.

FIG. 2 illustrates in block diagram form a neural network 40 suitable for manufacturing process estimation or the like according to the present invention. Neural network 40 includes generally three layers 41, 42, and 43. Layer 41 is a segmented, unsupervised competitive layer which receives the inputs of neural network 40, and provides outputs to layer 42. Layer 42 is an unsegmented, unsupervised, competitive layer which receives the outputs of layer 41, and provides outputs to layer 43. Layer 43 is a supervised, noncompetitive layer which provides predicted outputs of neural network 40.

Layer 41 includes segments corresponding to steps of a manufacturing process. FIG. 2 illustrates a first segment 50 corresponding to a process step 60, a second segment 51 corresponding to a process step 61, and a third segment 52 corresponding to a process step 62. Signal names for all segments are designated similarly. Segment 50 has a first input 53 for receiving a vector of inputs labelled "MEASURED PARAMETERS" associated with process step 60, a second input 54 for receiving a vector labelled "NULLS" corresponding to the MEASURED PARAMETERS, an output for providing output values corresponding to the MEASURED PARAMETERS labelled "OUTPUTS" and an output for providing signals indicative of the presence of NULL values for each MEASURED PARAMETER corresponding to each OUTPUT labelled "INHIBITS". Segment 51 has a first input 55 for receiving MEASURED PARAMETERS associated with process step 61, a second input 56 for receiving NULLS corresponding to the MEASURED PARAMETERS, and outputs for providing OUTPUTS and INHIBITS corresponding to the MEASURED PARAMETERS. Segment 52 has a first input 57 for receiving MEASURED PARAMETERS associated with process step 62, a second input 58 for receiving NULLS corresponding to the MEASURED PARAMETERS, and outputs for providing OUTPUTS and INHIBITS corresponding to the MEASURED PARAMETERS.

Layer 41 is a segmented, unsupervised, competitive layer. Each segment is competitive within itself. The competition function is set up such that the neuron with the highest NET value within the segment is the only neuron which is allowed to have a non-zero output value. The effect of this architecture is that each manufacturing sub-process is treated as a separate domain of input. Thus, each segment performs a self-organizing clustering operation within a manufacturing sub-process.

Layer 42 has first inputs for receiving OUTPUTS of each of the segments of layer 41, second inputs for receiving corresponding INHIBITS, first outputs for providing OUTPUTS corresponding to each neuron in layer 42, and a second output for providing a signal labelled "ABSOLUTE NULL". Layer 42 activates signal ABSOLUTE NULL to indicate that all INHIBIT inputs are active.

Layer 42 is an unsegmented, unsupervised, competitive layer. The competition function is set up such that the neuron with the highest NET value within the segment is the only neuron which is allowed to have a non-zero output value. Thus, only one of the OUTPUT signals from layer 42 becomes active at each iteration. The effect of this architecture is that each manufacturing sub-process as represented by a segment of layer 41 is merged back into the entire domain of the manufacturing process. Layer 42 then performs a self-organizing clustering operation on the OUTPUTS of layer 41.

Layer 43 has first inputs for receiving the OUTPUTS from layer 42, a second input for receiving signal ABSOLUTE NULL, and outputs for providing values labelled "PREDICTED OUTPUTS". Layer 43 is supervised, noncompetitive layer which provides outputs indicative of predicted parameters of the manufacturing process. Such outputs include measurable characteristics of the manufactured item which are used to categorize the product quality.

The architecture of neuron 40 models the manufacturing process by having a first layer segmented, a second layer correspond to the whole manufacturing process, and a last layer for prediction. The effect of this is threefold. First, layer 41 allows the network to focus on each manufacturing sub-process independent of each other manufacturing sub-process. This creates a clustering function which describes the sub-process in terms of only those manufacturing steps which occur in that same sub-process. Second, layer 42 allows the sub-domain clusters of layer 41 to be organized into a set of clusters which represent the relationship of the manufacturing sub-processes to each other, and to the manufacturing process as a whole. Third, layer 43 allows for the encoding of the relationship of the data measured during the manufacturing process and the quality-related data collected after the manufacturing process is completed. Once this relationship is encoded through the supervised training of layer 43, it becomes possible to use the network for prediction.

Process steps 60-62 are illustrative steps of a series of manufacturing steps which are performed sequentially to produce a product from raw materials. In the illustrated embodiment in which neural network 40 predicts output parameters of an integrated circuit manufacturing process, step 60 corresponds to nitride deposition for wells built in the wafer substrate, step 61 corresponds to the photolithography/etch step for the nitride well, and step 62 corresponds to a later source/drain implant step. The MEASURED VALUES at step 60 include the thickness of the nitride, the temperature of the deposition furnace, and the duration of the deposition cycle. The MEASURED VALUES at step 61 include the critical dimensions before and after etch. The MEASURED VALUES at step 62 include the implant dose and the sheet resistivity after implant. Because neural networks such as neural network 40 are self-organizing, the choice of parameters used as the MEASURED VALUES at each process step may vary without neural network 40 losing its predictive ability. In addition, there may be some process steps for which no MEASURED VALUE is obtainable, such as passivation deposition; thus neural network 40 does not have a segment corresponding to this processing step.

The PREDICTED OUTPUTS of neural network 40 predict parameters of interest which are normally determined after manufacturing is complete. After wafer fabrication is complete, an operation generally referred to as class probe is used to determine several characteristics of the wafer. The PREDICTED OUTPUTS thus include predictions of these outputs, including such values as transistor voltage thresholds, breakdown voltages, effective channel lengths ($L_{EFF}$s), and the like. After class probe, a subsequent functional probing step then determines further characteristics of the finished integrated circuit, including overall functionality, speed binning, and the like. Thus, neural network 40 also includes these predictions among the PREDICTED OUTPUTS.

Neural network 40 allows predictions of manufacturing parameters even when measured parameters are absent (i.e., NULL). This occurs in two cases. First, manufacturing data may be unavailable. Data unavailability may occur because a worker fails to record the measurements, a sensor breaks, etc. Data unavailability also occurs because neural network 40 models each possible manufacturing step, which is a superset of processing steps used for any particular wafer. Second, it is sometimes desirable to estimate the PREDICTED OUTPUTS prior to completion of the manufacturing process. Neural network 40 allows the benefits of neural networking in manufacturing processes by using NULL inhibiting neurons. This usage of NULL inhibiting neurons allows a greater predictive capability. Neural network 40 can be used to predict the quality of the product at any stage in processing by representing all of the incomplete processing data as NULL values on the input to the network. This result can be accomplished by training the network such that it is shown an increasingly larger set of input data (i.e., larger ratio of actual versus NULL data) with consistently complete desired output data. These increasingly larger sets of data represent the parallel to actual manufacturing which is accomplished in a similar serial fashion. This in effect encodes the temporal relationship of the manufacturing processes and their effects on quality.

Neural network 40 may be implemented by a variety of artificial neural network configurations, such as a software-based neural network running on a data processing system, digital circuitry, analog circuitry, or combinations of the three. In the context of manufacturing process 80 of FIG. 3, the MEASURED PARAMETERS are conveniently entered into a software database for collection and processing; thus, a software-based neural network is preferred. However, any of these enumerated neural networks may be used as well.

FIG. 3 illustrates in partial block diagram and partial logic diagram form a neuron 100 used in either neuron layer 41 or neuron layer 42 of FIG. 2. Neuron 100 includes inputs 101-103 for receiving data input vector X, inputs 104-106 for receiving a null input vector labelled "N", a first output for providing an output signal labelled "OUTPUT(k)", and a second output for providing an output signal labelled "INHIBIT(k)". Neuron 100 includes generally nullable weighting functions 110-112, a summing device 113, an activation function 114, and an inhibit detector 115.

Neuron 100 includes weighting functions each of which receives a corresponding input of input vector X, a corresponding input of null vector N, and provides an output labelled "$Y'_j$". FIG. 3 illustrates three representative weighting functions 110-112. Weighting function 110 has a first input for receiving signal $x_1$, a second input for receiving signal $N_1$, and an output for providing signal $y'_1$. Weighting function 111 has a first input for receiving signal $x_2$, a second input for receiving signal $N_2$, and an output for providing signal $y'_2$. Weighting function 112 has a first input for receiving signal $x_3$, a second input for receiving signal $N_3$, and an output for providing signal $y'_3$. Each of weighting functions 110-112 weights a corresponding input signal in vector X by a weight value conditionally in response to a corresponding null input in vector N.

The training rule for nullable weighting functions in neuron 100 differs from that of weighting functions in neuron 20: if an input is reported null, the weighting function does not update the weight. Mathematically, the weight for element i is updated according to the following:

$$w_{ijnew} = w_{ijold} + \alpha N_i(x_i - w_{ijold}) \qquad [2]$$

where $W_{ijnew}$ is the new (updated) weight value, $w_{ijold}$ is the old or last weight value, and $\alpha$ is the training rate coefficient.

Summing device 113 has inputs for receiving the output of each weighting function, and an output for providing value NET(k). Unlike neuron 20, neuron 100 provides a NET value defined by the following equation:

$$NET(k) = \Sigma x_i w_i N_i \qquad [3]$$

for i=1 to n.

Activation function 114 has a first input for receiving NET(k), second inputs for receiving (m−1) NET signals corresponding to all neurons 1 to n except for k, a third input for receiving a signal labelled "ABSOLUTE NULL", and an output for providing signal OUTPUT(k). Unlike activation function 28 in neuron 20, activation function 114 activates signal OUTPUT(k) if NET(k) is greater than NET(j) for all other neurons, and signal ABSOLUTE NULL is inactive.

Inhibit detector 115 includes a NOR gate 116 and an AND gate 117. NOR gate 116 has n input terminals corresponding to each of the n elements in data vector X and null vector N, for receiving each null input $N_i$ for i=1 to n. NOR gate 116 also has an output for providing a signal labelled "INHIBIT(k)" which is the inhibit output for neuron 100. AND gate 117 has m input terminals for receiving (m−1) INHIBIT signals from other neurons in layer 42, and an output terminal for providing signal ABSOLUTE NULL. Note that FIG. 3 illustrates inhibit detector 115 using logic gate symbols but encompasses other mechanisms, such as software running on a data processing system, for implementing the logic functions of logic gates 116 and 117. Neurons used in layer 42 are structurally the same as neuron 100 except that these neurons receive NET(k) and INHIBIT(k) inputs rather than X and N input vectors.

While the invention has been described in the context of a preferred embodiment, it will be apparent to those skilled in the art that the present invention may be modified in numerous ways and may assume many embodiments other than that specifically set out and described above. For example, neurons according to the present invention may be implemented using a variety of different activation functions, including Kohonen, Grossberg, and the like, and a variety of different learning rules, besides the ones illustrated. In addition, while the neural network was described in the context of semiconductor wafer processing, it is also applicable to other types of manufacturing processes. Accordingly, it is intended by the appended claims to cover all modifications of the invention which fall within the true spirit and scope of the invention.

I claim:

1. A neuron for recognizing a missing input value, comprising:

a predetermined number of first inputs for receiving data inputs of the neuron;

a plurality of second inputs corresponding to each of said predetermined number of first inputs for receiving null values;

each null value being in either a first logic state if a corresponding data input is missing, or a second logic state otherwise;

a plurality of nullable weighting elements coupled to said predetermined number of first inputs and to said plurality of second inputs, each nullable weighting element having a weight associated therewith and providing an output thereof as a product of either a corresponding data input and said weight when a corresponding null value is in said first logic state, or as a predetermined value otherwise;

a summing device coupled to said plurality of nullable weighting elements, for summing outputs of each nullable weighting element to provide a net output; and an activation element coupled to said summing device, for providing an output of the neuron in response to said net output and a predetermined activation function.

2. The neuron of claim 1 wherein said predetermined activation function is a Kohonen function.

3. The neuron of claim 1 wherein each of said plurality of nullable weighting elements updates said weight thereof in response to said corresponding data input and said corresponding null value.

4. The neuron of claim 3 wherein each of said plurality of nullable weighting elements updates said weight thereof equal to a prior weight, plus a product of, a training rate coefficient, said corresponding null value, and a difference between said corresponding data input and said prior weight.

5. The neuron of claim 1 further comprising an inhibit detector for activating an inhibit output signal in response to said corresponding null of each said plurality of nullable weighting elements being active.

6. The neuron of claim 1 wherein said activation element further has a plurality of net inputs and provides said output of the neuron further in response to said plurality of net inputs.

7. The neuron of claim 6 wherein said activation element further has an input for receiving an absolute null signal, and provides said output of the neuron in an inactive state further in response to said absolute null signal being active.

8. The neuron of claim 1 wherein said predetermined activation function is a Grossberg function.

9. The neuron of claim 1 further comprising a learning element for adjusting said weight associated with each of nullable said plurality of weighting elements in response to said output of the neuron and a training information signal.

10. A neuron for recognizing a missing input value, comprising:

a predetermined number of first inputs for receiving inputs $x_i$ of the neuron;

a plurality of second inputs corresponding to each of said predetermined number of first inputs for receiving null values $n_i$;

each null value $n_i$ being in either a first logic state if a corresponding input $x_i$ is missing, or a second logic state otherwise;

a plurality of null-inhibiting weighting elements for storing a plurality of weights $w_i$ corresponding to each of said predetermined number of first inputs, each null-inhibiting weighting element providing an output thereof $y'_i$ as a product of a corresponding input $x_i$, said a corresponding weight $w_i$, and a corresponding null value $n_i$;

a summing device coupled to said plurality of null-inhibiting weighting elements, for summing outputs of each null-inhibiting weighting element to provide a net output NET defined by NET $=\Sigma x_i * w_i * n_i$; and an activation element coupled to said summing device, for providing an output of the neuron in response to said net output NET and a predetermined activation function.

11. The neuron of claim 10 wherein said predetermined activation function is a Kohonen function.

12. The neuron of claim 10 wherein each of said plurality of null-inhibiting weighting elements updates a weight thereof in response to said corresponding input $x_i$ and said corresponding null value $n_i$.

13. The neuron of claim 12 wherein each of said plurality of null-inhibiting weighting elements updates said weight thereof $w_i$ equal to a prior weight, plus a product of, a training rate coefficient, said corresponding null value $n_i$, and a difference between said corresponding input $x_i$ and said prior weight.

14. The neutron of claim 10 further comprising an inhibit detector for activating an inhibit output signal in response to each corresponding null value $n_i$ being active.

15. The neuron of claim 10 wherein said activation element further has a plurality of net inputs and provides said output of the neuron further in response to said plurality of net inputs.

16. The neuron of claim 15 wherein said activation element further has an input for receiving an absolute null signal, and provides said output of the neuron in an inactive state further in response to said absolute null signal being active.

17. The neuron of claim 10 wherein said predetermined activation function is a Grossberg function.

18. The neuron of claim 10 further comprising a learning element for adjusting said corresponding weight $w_i$ of each of said plurality of null-inhibiting weighting elements in response to said output of the neuron and a training information signal.

19. A neural network for recognizing a missing input value comprising:

a first layer of segmented neurons of a first type receiving a plurality of input signals and a plurality of null inputs corresponding to each of said plurality of input signals, and providing a plurality of first output signals in response to said plurality of input signals and said plurality of null inputs;

a second layer of neurons of a second type operably coupled to said first layer of segmented neurons, said second layer of neurons receiving each of said plurality of first output signals, and activating at least one of a plurality of second output signals in response; and a third layer of neurons of a third type operably coupled to said second layer of neurons, said third layer of neurons receiving said plurality of second output signals, and providing at least one output of the neural network in response to said at least one of said plurality of second output signals activated by said second layer of neurons;

said first and second types characterized as being unsupervised and competitive;

said third type characterized as being supervised and noncompetitive.

20. The neural network of claim 19, wherein said first layer of segmented neurons comprises a plurality of neurons, each of said plurality of neurons including a plurality of weighting elements which conditionally updates weights thereof in response to a corresponding one of said plurality of null inputs.

21. The neural network of claim 19 wherein said first layer of segmented neurons provides said plurality of first output signals in response to said plurality null inputs.

22. A method for recognizing a missing input value while estimating an unknown parameter, comprising the steps of:

inputting a plurality of first measured values and a plurality of first null values corresponding thereto to a first neuron segment, each of said plurality of first null values indicating when in an active logic state thereof that a corresponding one of said plurality of first measured values is missing;

inputting a plurality of second measured values and a plurality of second null values corresponding thereto to a second neuron segment, each of said plurality of second null values indicating when in an active logic state thereof that a corresponding one of said plurality of second measured values is missing;

operably coupling together each of a plurality of neurons of said first neuron segment such that each of said plurality of neurons of said first neuron segment provides an output thereof in partial dependence on said output of others of said plurality of neurons of said first neuron segment;

operably coupling together each of a plurality of neurons of said second neuron segment such that each of said plurality of neurons of said second neuron segment provides an output thereof in partial dependence on said output of others of said plurality of neurons of said second neuron segment; and estimating the unknown parameter from said outputs of each of said first and second neuron segments when at least one of said pluralities of first and second null values is inactive.

23. The method of claim 22 wherein said step of estimating the unknown parameter comprises the steps of:

outputting said outputs of each of said first and second neuron segments, forming a first layer of segmented neurons, to a second layer of neurons;

operably coupling together each of a plurality of neurons of said second layer of neurons such that each of said plurality of neurons of said second layer of neurons provides an output thereof in partial dependence on said output of others of said plurality of neurons within said second layer of neurons; and estimating the unknown parameter in response to a plurality of outputs of said second layer of neurons.

24. The method of claim 23 wherein said step of estimating the unknown parameter comprises the steps of:

outputting said outputs of said second layer of neurons to a third layer of neurons; and estimating the unknown parameter as an output of said third layer of neurons.

25. The method of claim 24 further comprising the step of training said third layer of neurons in response to a training information input.

* * * * *

UNITED STATES PATENT AND TRADEMARK OFFICE
CERTIFICATE OF CORRECTION

PATENT NO. : 5,448,684
DATED : Sep. 5, 1995
INVENTOR(S) : James C. Holt

It is certified that error appears in the above-indentified patent and that said Letters Patent is hereby corrected as shown below:

Column 9, line 5, before "said" delete [nullable].

Column 9, line 5, before "weighting" insert --nullable--.

Signed and Sealed this

Second Day of April, 1996

Attest:

BRUCE LEHMAN

Attesting Officer

Commissioner of Patents and Trademarks